United States Patent [19]

Dai et al.

[11] Patent Number: 5,391,286
[45] Date of Patent: Feb. 21, 1995

[54] PROCESS FOR CATALYTIC DEWAXING OF HYDROCARBON FEEDSTOCKS

[75] Inventors: Pei-Shing E. Dai; Robert J. Taylor, Jr.; Randall H. Petty, all of Port Arthur; Joseph A. Durkin, Groves, all of Tex.

[73] Assignee: Texaco Inc., White Plains, N.Y.

[21] Appl. No.: 145,274

[22] Filed: Nov. 3, 1993

[51] Int. Cl.⁶ .................... C10G 73/38; C10G 73/00
[52] U.S. Cl. ................................ 208/27; 208/109; 208/110; 208/111
[58] Field of Search ............... 208/109, 110, 111, 18, 208/27

[56] References Cited

U.S. PATENT DOCUMENTS

| | | | |
|---|---|---|---|
| 2,547,380 | 4/1951 | Fleck | 208/136 |
| 3,668,113 | 6/1972 | Burbridge et al. | 208/97 |
| 3,700,585 | 10/1972 | Chen et al. | 208/111 |
| 3,725,302 | 4/1973 | Shimely et al. | 252/431 R |
| 3,790,471 | 2/1974 | Argauer et al. | 208/111 |
| 3,894,938 | 7/1975 | Gorring et al. | 208/97 |
| 3,980,550 | 9/1976 | Gorring et al. | 208/111 |
| 4,138,363 | 2/1979 | Hertzenberg et al. | 252/430 |
| 4,203,869 | 5/1980 | Rollman | 252/455 Z |
| 4,229,282 | 10/1980 | Peters et al. | 208/111 |
| 4,447,583 | 10/1984 | Rodewald | 502/71 |
| 4,458,024 | 7/1976 | Gorring et al. | 208/111 |
| 4,510,044 | 4/1985 | Oleck et al. | 208/111 |
| 4,743,355 | 5/1988 | Ward | 208/59 |
| 4,810,357 | 3/1989 | Chester et al. | 208/78 |
| 4,950,835 | 8/1990 | Wang et al. | 585/467 |

OTHER PUBLICATIONS

Richter et al., "Specific Modification of the External Surface of ZSM-5 Zeolites by 12-Tungstosilicic Acid", J. Chem. Soc. Faraday Trans., 87(9), 1461-1466, 1991.

*Primary Examiner*—Helen M. S. Sneed
*Assistant Examiner*—Walter D. Griffin
*Attorney, Agent, or Firm*—James L. Bailey; Kenneth R. Priem; Walter D. Hunter

[57] ABSTRACT

A process for catalytic hydrodewaxing hydrocarbon feedstocks is disclosed. The catalyst comprises a surface-modified crystalline aluminosilicate zeolite, such as ZSM-5 type zeolite in a matrix or binder, such as alumina, having a specified metals content. The process is especially useful for dewaxing lubricating oil basestocks.

15 Claims, No Drawings

PROCESS FOR CATALYTIC DEWAXING OF HYDROCARBON FEEDSTOCKS

BACKGROUND OF THE INVENTION

1. Field of the Invention

This invention relates to a process for hydrodewaxing a hydrocarbon oil feedstock. More particularly, this invention is concerned with a catalytic process for hydrodewaxing a hydrocarbon oil feedstock such as a light hydrocarbon feedstock. It is further concerned with a process for manufacturing a high Viscosity Index (VI) distillate lubricating oil stock of low pour point and with good yield.

In the hydrodewaxing process of this invention a light waxy hydrocarbon oil feedstock, for example, and hydrogen are contacted at an elevated temperature and pressure with a catalyst composition comprising a specified amount of an oxide of a Group VIII metal, such as an oxide of nickel or cobalt and an oxide of a Group VIB metal, such as an oxide of molybdenum or tungsten, supported on a porous support comprising a matrix or binder and a ZSM-5 type crystalline aluminosilicate zeolite and wherein the said support has a polyoxymetalate-modified surface.

In the catalytic hydrodewaxing process of this invention a hydrocarbon oil feed, such as a waxy hydrocarbon fraction, is contacted with hydrogen and the surface-modified catalyst in a manner such that a high viscosity index developed hydrocarbon oil is achieved in high yield.

2. Prior Art

Paraffin distillates and residual oils leaving the refinery crude stills contain wax and are normally solids at ambient temperatures. The deasphalting and refining processes increase the wax content of the lube feedstocks. Removal of the wax from these fractions is necessary to permit the manufacturing of lubricating oils with the desired low temperature properties. Catalytic and solvent dewaxing are the major processes used in the petroleum industry today for removing this wax.

The catalytic dewaxing process works by selectively cracking the waxy molecules over a zeolite catalyst. This differs from solvent dewaxing, where the wax is removed from the oil based on its solubility when dissolved in a suitable solvent. These different mechanisms for wax removal give the dewaxed oil product from the two processes different properties. Generally, the dewaxed oil from solvent dewaxing is obtained in a higher yield and has a higher viscosity index (VI) than that obtained from catalytic dewaxing. The loss in yield and VI observed for catalytic dewaxing compared with solvent dewaxing the same feedstock is called the yield and VI penalty. It is desirable to produce dewaxed oil from catalytic dewaxing without any yield or VI penalty.

The presently available commercial catalytic dewaxing processes which utilize a ZSM-5 containing catalyst work well for producing the heavy neutral oils and bright stocks. However, these processes suffer from severe yield and VI penalties when processing lighter feedstocks. A catalyst capable of dewaxing a light feedstock to a low pour, high VI product without dewaxed oil yield loss is not currently available.

A number of other processes for catalytic dewaxing of hydrocarbon oils to reduce the temperature at which separation of waxy hydrocarbons occurs have been described in the art.

U.S. Pat. No. 4,743,355 discloses a process in which a waxy hydrocarbon feedstock is converted into a high quality lube oil stock of reduced pour point by hydrodewaxing the feedstock in the presence of catalyst comprising, for example, a porous refractory oxide such as alumina and a crystalline zeolite having a ZSM-5 zeolite structure and passing a portion of the effluent from the hydrodewaxing zone to a hydrocracking zone where it is a hydrocracking catalyst under conditions such that a further reduction in pour point is effected.

U.S. Pat. No. 4,458,024 teaches a single stage hydrotreating and hydrodewaxing process in which a petroleum residua is contacted with a catalyst comprising a ZSM-5 zeolite in an alumina binder. The catalyst employed has about 80% of its pore volume in pores no greater than 100 Angstroms in diameter and at least 90% of its pore volume in pores no greater than 150 Angstroms in diameter.

U.S. Pat. No. 3,668,113 discloses a process in which a hydrocarbon fraction is reduced in sulfur and n-paraffin wax content by first contacting the hydrocarbon fraction with a catalyst comprising a hydrogenating component and a crystalline mordenite to remove n-paraffin wax and then contacting the dewaxed fraction with a catalyst comprising a hydrogenating component on a refractory inorganic oxide to remove sulfur.

U.S. Pat. No. 3,700,585 teaches a dewaxing process in which a petroleum feedstock having a boiling point above 350° F. is contacted with a zeolite ZSM-5 or ZSM-8 having an associated hydrogenation component and, optionally, in the presence of hydrogen.

U.S. Pat. No. 3,894,938 discloses a process for dewaxing and desulfurizing high pour point high sulfur gas oil in which the gas oil is first contacted with a ZSM-5 type zeolite which may contain a hydrogenation component in the presence or absence of added hydrogen followed by conventional hydrodesulfurization processing.

U.S. Pat. No. 3,980,550 discloses a process for dewaxing a gas oil by contacting the gas oil with hydrogen in the presence of a catalyst such as a ZSM-5 type having at least one multi valent transition metal.

U.S. Pat. No. 4,229,282 teaches a catalytic dewaxing process in which a hydrocarbon oil is contacted in the presence of hydrogen with catalyst comprising a dense zeolite, such as a dense ZSM-5 zeolite and a hydrogenation component.

U.S. Pat. No. 4,810,357 discloses a process for dewaxing relatively heavy or relatively light lube chargestocks in two parallel separate reactors where the catalyst employed in the reactor used for dewaxing the relatively light chargestock is a zeolite catalyst such as ZSM-22, ZSM-23 or ZSM-35 while in the reactor used for dewaxing the relatively heavy chargestock the catalyst used is a zeolite such as ZSM-5, ZSM-11, etc.

U.S. Pat. No. 4,510,044 discloses a single stage hydrodewaxing and hydrotreating process in which hydrogen and a petroleum residua is contacted with a catalyst comprising a ZSM-5 type zeolite in an alumina binder having a hydrogenation component and having 90% of its pore volume in pores no greater than 150 Angstroms in diameter.

U.S. Pat. No. 4,203,869 teaches a process for preparing a crystalline aluminosilicate zeolite having an aluminum-free outer shell of crystalline $SiO_2$ where the zeolite is prepared by (1) initiating crystallization in a crystallization medium to produce the zeolite and then altering the crystallization medium to eliminate the aluminum therein where the outer shell of $SiO_2$ has the same crystal structure as the zeolite.

U.S. Pat. No. 3,725,302 discloses a process in which the external surfaces of crystalline aluminosilicates are treated with hydrocarbyl halosilanes or their condensation products with ammonia, primary amines, secondary amines or alcohols to modify the surface adsorptive properties of the aluminosilicates. Useful hydrocarbyl halosilanes include trimethylchlorosilane, triphenylchlorosilane, etc.

U.S. Pat. No. 4,447,583 teaches a method for preparing a composition comprising a crystalline zeolite such as ZSM-5 coated with silica that extensively covers and resides on the external surfaces thereof. Silicon-containing compounds employed in the coating process include diethylsilicone, phenylethylsilicone, methyltrifluoropropylsilicone, methylvinylsilicone, etc.

U.S. Pat. No. 4,950,835 teaches a process for preparing a catalyst through vapor phase disposition of Si on the surface of an HZSM-5 catalyst obtained by ion exchanging ZSM-5 catalyst. Useful silicon sources include tetraalkyl orthosilicate or tetraalkoxysilane.

U.S. Pat. No. 4,138,363 discloses hydrophilic silane-zeolite compositions formed by condensing a hydrophilic silane, such as methyltrichlorosilane, gamma-amino-propyltrimethoxylsilane, etc., onto the surface of a hydrated zeolite.

European Patent Application 88120998.5 of Dec. 15, 1988 teaches a process for preparing p-ethylphenol utilizing a catalyst of a crystalline aluminosilicate, such as a ZSM-5 zeolite, incorporating a specific amount of an alkoxysilane.

SUMMARY OF THE INVENTION

The instant invention is a process for hydrodewaxing a hydrocarbon oil feedstock boiling above about 350° F. such as light waxy feedstocks including, for example, light waxy distillates, raffinates and hydrorefined oils which comprises contacting said oil and hydrogen at a hydrogen pressure of from about 300 to about 2000 psig, a temperature of from about 400° to about 900° F. and at a space velocity of about 0.1 to about 10.0 LHSV with a catalyst comprising about 0.5 to about 30 wt. %, preferably about 3 to about 15 wt. %, based on the total weight of the catalyst of an oxide of a Group VIII metal, preferably nickel or cobalt; and an oxide of a Group VIB metal, preferably tungsten or molybdenum; supported on a porous support comprising a matrix containing about 50 to about 95 wt. %, preferably about 65 to about 85 wt. %, based on the weight of the support, of a pentasil type crystalline aluminosilicate zeolite having a $SiO_2/Al_2O_3$ mole ratio of 30 to 150 and wherein the said support has a polyoxymetalate-modified surface.

In this specification and in the claims the term "hydrodewaxing" is used in its broadest sense and is intended to mean a process conducted in the presence of hydrogen wherein those hydrocarbons which readily solidify (waxes) from petroleum stocks are converted or removed.

Any hydrocarbon oil, regardless of the source that boils above about 350° F. and has an unacceptable content of waxy components such that its pour point is in excess of that required for a given product may be hydrodewaxed by the process of this invention. For example, hydrocracked oils, oils from coal or tar sands and especially petroleum oils may be treated using the process of this invention to produce lube oil, jet fuel, diesel fuel, or any of a number of other petroleum oil products of reduced pour point.

The catalytic hydrodewaxing process of this invention is conducted, for example, by contacting the feed to be dewaxed with a fixed stationary bed of catalyst, with a fixed fluidized bed or with a transport bed, as desired. One preferred configuration is a trickle-bed operation in which the feed is allowed to trickle through a stationary fixed bed in the presence of hydrogen. Generally, in order to obtain maximum benefits from this invention it is desirable to initiate the reaction with fresh catalyst at a relatively low temperature such as 500° to 600° F. As the catalyst ages its temperature is of course raised in order to maintain high catalytic activity. Usually, for lube oil base stocks the run is terminated when the temperature reaches about 700° F. after which regeneration of the catalyst can be achieved by contacting the catalyst, for example, at an elevated temperature with hydrogen gas.

The dewaxed oil obtained from the process of this invention has a high viscosity index and is obtained in a high yield. This process is especially useful for dewaxing light waxy feedstocks where large yield and VI losses are observed in the process known in the art.

DESCRIPTION OF THE PREFERRED EMBODIMENTS

The hydrodewaxing process of this invention is useful for reducing the pour point of a wide variety of hydrocarbon oil feedstocks ranging from light distillate fractions up to high boiling feedstocks such as whole crude petroleum, reduced crudes, vacuum tower residua, e.g., brightstock, cycle oils, gas oils, vacuum gas oils, etc. This process is particularly useful for treating waxy distillate stocks, such as gas oils, kerosenes, jet fuels, lubricating oil stocks, hydrotreated oil stock, heating oils, solvent-extracted lubricating oil stock and other distillate fractions where the pour point and viscosity values must be within certain specification limits.

The catalyst employed in the process of this invention preferably comprises about 0.5 to about 30 wt. %, based on the total weight of the catalyst, of a metal oxide of a Group VIII metal and an oxide of a Group VIB metal, supported on a porous support, comprising a matrix containing about 50 to about 95 wt. % of a ZSM-5 type crystalline aluminosilicate zeolite based on the weight of the support and having a modified surface. Group VIB and Group VIII as referred to herein are Group VIB and Group VIII of the Periodic Table of Elements. The Periodic Table of Elements referred to herein is found on the inside cover of the *CRC Handbook of Chemistry and Physics*, 55th Ed. (1974–75). The above-described support may be purchased or prepared by methods well known to those skilled in the art.

A wide variety of pentasil type zeolites may be employed in preparing the catalysts of this invention. Particularly useful are the pentasil type zeolites which include:

ZSM-5, ZSM-11, ZSM-12, ZSM-23, ZSM-35 and ZSM-38 and other isomorphous substitute materials, such as [B], [Ga] and [Fe]-ZSM-5. U.S. Pat. No. 3,702,886, describing and claiming ZSM-5 is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

The activity and selectivity of the zeolite for selectively cracking the waxy molecules is mainly determined by the structure and acidity of the zeolite framework.

The structure of the zeolite framework is determined by the method of preparation. Different zeolite structures have different framework pore openings, which are important in the selectivity of the catalyst. The catalyst selectivity comes from the ability of the zeolite to discriminate between wax and oil molecules based on size. In ZSM-5, the straight chain and slightly branched chain waxy molecules can enter the zeolite channels while the bulky oil molecules cannot. Since the active cracking sites are inside the channels of the zeolite, access to these sites is important. If the pore openings are too large the catalyst shows no selectivity because either the wax or the oil molecules can get to the active sites and if they are too small it shows no activity because neither type of molecules can get to the active sites.

The acidity of the zeolite has a major influence on the cracking activity of the catalyst and is determined by both the method of zeolite preparation and the type of post-treatment the zeolite receives. Zeolites are crystalline aluminosilicates and their acidity is greatly affected by the $SiO_2/Al_2O_3$ molar ratio, i.e., the SAR ratio in the framework. The SAR can affect both the total number of acid sites as well as the strength of the sites. Generally in preparing the catalysts of this invention pentasil type zeolites having a SAR of about 30 to about 300, preferably from about 50 to about 280 are employed.

The support utilized in preparing the catalyst of this invention comprises a matrix or binder together with the above-described crystalline aluminosilicate zeolite. A wide variety of matrix materials which are resistant to the temperature and other conditions employed in this process can be used. Usually, the support will comprise about 50 to about 99 wt. %, preferably about 65 to about 85 wt. % of the ZSM-5 type zeolite, based on the weight of the support, with the balance being a suitable matrix material. Such matrix materials include, for example, inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, macrite or anauxite. Such clays can be used in the raw state as originally mined or initially subjected to calcination, acid treatment or chemical modification.

In addition to the foregoing materials, the pentasil type zeolites employed herein to prepare the catalyst composition may be composited with a porous matrix material, such as alumina, silica-alumina, silica-magnesia, silica-zirconia, silica-thoria, silica-beryllia, silica-titania as well as ternary compositions, such as silica-alumina-thoria, silica-alumina-zirconia, silica-alumina-magnesia and silica-magnesia-zirconia, etc.

Generally, the hydrodewaxing process of this invention is conducted at a temperature of about 400° to about 900° F., preferably at about 500° to about 700° F., at a LHSV of about 0.1 to about 10.0, preferably at about 0.5 to about 4.0, at a pressure of about 100 to about 2000 psig, preferably at about 300 to about 600 psig and at a hydrogen circulation rate of about 1000 to about 15,000 SCFB (standard cubic feet per barrel of feed), preferably at about 2000 to about 4000 SCFB.

In preparing the catalyst the support containing the crystalline aluminosilicate is impregnated via conventional means known to those skilled in the art with the requisite amount of the metal compound or compounds which will provide on the support of the finished catalyst after calcination an oxide or a Group VIII metal and an oxide of a Group VIB metal. The finished catalyst will comprise about 0.5 to about 30 wt. %, preferably about 1 to about 15 wt. % of the metal oxides on the support, based on the total weight of the catalyst.

The Group VIII metal may be iron, cobalt or nickel which is loaded on the support, for example, as an about 0.5 to about 30 wt. %, preferably about 3 to about 15 wt. % of an aqueous solution of metal nitrate. The preferred metal of this group is nickel which may be employed as an about 0.5 to about 34 wt. % aqueous solution of nickel nitrate hexahydrate.

Polymeric oxoanions formed by the condensation of two different oxoanions are known as heteropolyanions. Oxoanions of acidic elements such as Mo, W, V, Nb and Ta present in aqueous solution polymerize to form polyanions at low pH. Free acids or acid forms of this type are called heteropoly acid. Heteropoly acids such as those formed with Group VIB metals, as exemplified by tungsten and molybdenum, are employed in preparing the catalysts utilized in this invention.

Preferably the Group VIB metal utilized in preparing the catalyst of this invention is tungsten or molybdenum, most preferably tungsten, employed typically as an about 3 to about 30 wt. % of an aqueous solution of a heteropoly acid, such as 12-tungstosilicic acid.

The catalyst of this invention is prepared by:

a) impregnating the porous support with an aqueous solution of a heteropoly acid of a Group VIB metal, such as 12-tungstosilicic acid, 12-molybdophosphoric acid, cesium, hydrogen 12-tungstophosphate and dimeric potassium 6-tungstocobaltate, etc., b) drying the impregnated support prepared in step (a) in air at a temperature of 140° to about 350° F. for about 2 to about 8 hours, c) impregnating the dry impregnated support prepared in step (b) with an aqueous solution of a Group VIII metal salt, such as nickel nitrate hexahydrate, to form the final impregnated support, and d) calcining the impregnated support of step (c) at a temperature of 500° to about 1150° F. thereby forming the heteropoly acid-modified catalyst having provided on the support hereof a polyoxo-metalate-modified surface and the Group VIB metal and the Group VIII metal in oxide form.

Alternatively, the heteropoly acid-modified catalyst can be prepared by:

a) impregnating the porous support with an aqueous solution of (1) a heteropoly acid of a Group VIB metal, such as 12-tungstosilicic acid, etc., and (2) a Group VIII metal salt, such as nickel nitrate hexahydrate, etc., and b) calcining the impregnated support of step (a) at a temperature of 500° to about 1150° F. thereby forming the heteropoly acid-modified catalyst having provided on the support thereof a polyoxometalate-modified surface and the Group VIB and Group VIII metals in oxide form.

Preferably, in both catalyst processes the support employed in preparing the catalyst prior to impregnation with the metal compounds is calcined in air at a temperature of 1000° F. to about 1150° F. for 0.5 to about 3 hours or more and, prior to final calcination, the impregnated support is air dried at a temperature of 140° to about 350° F. for 2 to about 24 hours.

The catalyst support in both of the above-described catalyst processes is impregnated with sufficient of the metal compounds to furnish the desired amount of the required metals in the form of metal oxides after the final calcination step.

Evaluation of the Dewaxing Activity of the Catalysts—Examples 1–3

The feedstock used in Examples 1–3 was a light neutral waxy stock which had been MP solvent refined and hydrogen finished at low hydrogen pressure and low temperature over a Ni/Mo/alumina catalyst. The feedstock properties are shown in Table I below.

TABLE I

| FEEDSTOCK PROPERTIES | |
|---|---|
| Tests | |
| API Gravity | 35.0 |
| RI @ 70° C. | 1.4515 |
| ASTM Color | <0.5 |
| Flash, COC | 385° F. |
| ASTM Pour | 80° F. |
| Neutral Number | 0.02 |
| Viscosity, 65.6° C., cSt | 7.94 |
| Viscosity, 100° C., cSt | 3.83 |
| Viscosity Index | 116 |
| NMR Hydrogen, wt. % | 14.03 |
| Sulfur, wt. % | 0.11 |
| Basic Nitrogen, ppm | 3 |
| MCRT, wt. % | 0.02 |
| Ash, wt. % | 0 |
| TBP by GC Temp. F. D2887 | |
| IBP/1% off | 573°/615° F. |
| 3/5 | 653°/669° F. |
| 10/20 | 689°/713° F. |
| 30/40 | 730°/744° F. |
| 50/60 | 759°/774° F. |
| 70/80 | 790°/809° F. |
| 90/100 | 838°/863° F. |
| 98/FBP | 890°/917° F. |
| Wt. % Oil (+68° F. Pour), SP488 | 93.2 |
| Wt. % Oil (+32° F. pour) | 83.0 |
| Wt. % Oil (−4° F. Pour) | 78.9 |
| Wt. % Oil (−40° F. Pour) | 76.4 |

Crude Source (%): 42.4 Arabian Light Berri, 32.4 Scurry, 12.0 Lafitte-Paradis, 11.0 LL&E, and 2.2 West Texas-Sweet (% by volume)

Dewaxing experiments in Examples 1–3 were carried out in a bench-scale fixed bed reactor in downflow configuration. The reactor had a 1 3/16 inch internal diameter and thermocouple wells entering from the top and bottom. The reactor was loaded with 40 ml of catalyst (nominal 1/16 inch extrudates) following which the void space in the catalyst bed was filled with 16 ml of 80–200 mesh silica. The catalyst bed height was about 5 inches. Six inches of glass beads above the catalyst bed served as a preheat zone for the feed in the reactor.

The catalyst was gradually heated to 450° F. (over a 4 hour period) under a hydrogen flow of 1 L/min at 600 psig. Next, the catalyst was gradually heated (over a 4 hour period) to 700° F. under a $H_2S/H_2$ (10% $H_2S$) flow of 0.5 L/min at 40 psig. After a 1 hour hold at 700° F. the catalyst was purged for 4 hours with hydrogen at 0.2 L/min and 500 psig.

The feed was cut into the reactor at 1 LHSV and the hydrogen flow was adjusted to 2500 SCFB after which the conditions were allowed to stabilize over a 12 hour period. Samples were collected at 4 hour intervals and stripped with nitrogen at 350 sccm at 275° F. for 4 hours. The stripped product was collected and analyzed for pour point and viscosity at 40° and 100° C. The viscosity indices were calculated according to the method of ASTM D 2270. The pour points were determined according to the method of ASTM D 97. Dewaxed oil (DWO) yield was calculated by dividing the weight of liquid product collected after stripping by the weight of feed entering the reactor during the collection period.

The following examples illustrate the practice of this invention without being limiting upon the scope thereof.

EXAMPLE 1

Example of Invention

A mixture of 80 wt. % ZSM-5 (molar ratio of $SiO_2/Al_2O_3 = 50$) and 20 wt. % alumina was extruded to form a nominal 1/16 inch extrudate employed as the catalyst support in this example.

The extrudate was air calcined at 1000° F. 51.2 grams of the calcined extrudate was impregnated with 3.6 grams of 12-tungstosilicic acid (76.6 wt. % W) in 53 grams of water. The wet catalyst was air dried at 250° F. for 4 hours and then was impregnated with 4.4 grams of nickel nitrate hexahydrate in 50 grams of water. The wet catalyst was then air dried and calcined at 1000° F. for 2 hours.

The final catalyst having a polyoxometalate-modified surface had a calculated nickel oxide (NiO) content of about 2.0 wt. % and a calculated tungsten oxide ($WO_3$) content of about 6.3 wt. %.

The catalyst was evaluated for dewaxing performance using the feedstock and procedure described previously. Dewaxing conditions and the dewaxed oil yield and product properties are shown in Table II.

TABLE II

CATALYTIC DEWAXING
Example 1
CONDITIONS: 500 psig, 2500 SCFB, 1 LHSV

| Test Period | 1 | 2 | 3 | 4 | 5 | 6 |
|---|---|---|---|---|---|---|
| CATALYST AGE, HR | 16–24 | 40–48 | 80–88 | 100–116 | 120–132 | 136–148 |
| TEMPERATURE, °F. | 500 | 550 | 570 | 560 | 565 | 565 |
| POUR POINT, °F. | 75 | 5 | −10 | 10 | 5 | 15 |
| DWO YIELD, WT. % | 90.5 | 74.6 | 70.7 | 74.3 | 74.6 | 74.9 |
| VISCOSITY INDEX | 109 | 90 | 86 | 92 | 92 | 92 |
| VISCOSITY SUS, 100° F. | 96 | 118 | 124 | 116 | 117 | 115 |

| Test Period | 7 | 8 | 9 | 10 |
|---|---|---|---|---|
| CATALYST AGE, HR | 164–180 | 192–208 | 216–224 | 228–264 |
| TEMPERATURE, °F. | 550 | 565 | 600 | 615 |
| POUR POINT, °F. | 55 | 45 | −15 | −20 |
| DWO YIELD, WT. % | 82.8 | 80.2 | 70.2 | 69.3 |
| VISCOSITY INDEX | 101 | 99 | 85 | 83 |

TABLE II-continued

CATALYTIC DEWAXING
Example 1
CONDITIONS: 500 psig, 2500 SCFB, 1 LHSV

| | | | | |
|---|---|---|---|---|
| VISCOSITY SUS, 100° F. | 105 | 109 | 124 | 130 |

EXAMPLE 2 (Comparative)

A mixture of 80 wt. % ZSM-5 ($SiO_2/Al_2O_3=31$) and 20 wt. % alumina was extruded to form a nominal 1/16 inch extrudate used as the catalyst support in this Example.

The extrudate was air calcined at 1000° F. 63.8 grams of the calcined extrudate was impregnated with 5.42 grams of nickel nitrate hexahydrate and 4.71 grams of ammonium metatungstate (73.8 wt. % W) in 28 grams of water. The wet catalyst was then air dried and calcined at 1000° F.

The final catalyst had a calculated nickel oxide (NiO) content of about 2.0 wt. % and a calculated tungsten oxide ($WO_3$) content of about 6.3 wt. %.

The catalyst was evaluated for dewaxing performance using the feedstock and procedure described above. Dewaxing conditions, dewaxed oil yield and product properties are shown in Table III.

TABLE III

CATALYTIC DEWAXING
CONDITIONS: 500 psig, 2500 SCFB, 1 LHSV

| TEST PERIOD | 1 | 2 | 3 | 4 | 5 |
|---|---|---|---|---|---|
| CATALYST AGE, HR | 8–24 | 28–44 | 48–68 | 104–116 | 128–136 |
| TEMPERATURE, °F. | 500 | 540 | 570 | 580 | 595 |
| POUR POINT, °F. | 70 | 45 | 15 | 25 | 0 |
| DWO YIELD, WT. % | 88.3 | 77.1 | 69.4 | 71.4 | 67.2 |
| VISCOSITY INDEX | 111 | 98 | 86 | 88 | 85 |
| VISCOSITY SUS, 100° F. | 99 | 115 | 132 | 128 | 132 |

EXAMPLE 3 (Comparative)

A mixture of 80 wt. % ZSM-5 (molar ratio of $SiO_2/Al_2O_3=51$) and 20 wt. % alumina was extruded to form a nominal 1/16 inch extrudate which was employed as the support in this Example.

The extrudate was air calcined at 1000° F. after which 100 grams of the calcined extrudate was impregnated with 7.92 grams of nickel nitrate hexahydrate and 6.86 grams of ammonium metatungstate (73.8 wt. % W) in 31 grams of water. The wet catalyst was then air dried and calcined at 1000° F.

The final catalyst had a calculated nickel oxide (NiO) content of about 2.0 wt. % and a calculated tungsten oxide ($WO_3$) content of about 6.3wt. %.

The catalyst was evaluated for dewaxing performance using the feedstock and procedure previously outlined. Dewaxing conditions, dewaxed oil yield and product properties are shown in Table IV.

TABLE IV

CATALYTIC DEWAXING

| TEST PERIOD | 1 | 2 | 3 | 4 | 5 | 6 |
|---|---|---|---|---|---|---|
| CATALYST AGE, HR | 17–32 | 52–68 | 152–168 | 184–200 | 208–220 | 252–284 |
| TEMPERATURE, °F. | 500 | 525 | 538 | 550 | 548 | 546 |
| POUR POINT, °F. | 60 | 30 | 20 | −25 | −15 | 10 |
| DWO YIELD, WT. % | 85.8 | 74.6 | 71.6 | 67.7 | 68.4 | 71.0 |
| VISCOSITY INDEX | 104 | 91 | 89 | 83 | 85 | 88 |
| VISCOSITY SUS, 100° F. | 106 | 120 | 124 | 131 | 128 | 125 |

TABLE IV-continued

CATALYTIC DEWAXING

| TEST PERIOD | 1 | 2 | 3 | 4 | 5 | 6 |
|---|---|---|---|---|---|---|
| SUS, 100° F. | | | | | | |

The desired product from the process of this invention has a pour point of +10° to +15° F. In Table V below a summary of the yield and VI values obtained for a +10° to +15° F. pour point of products obtained in Example 1 and in Comparative Examples 2 and 3 is presented. These data clearly show the superior VI values and dewaxed oil yields achieved with the product of Example 1 in which a catalyst with a polyoxometalate-modified surface was employed.

TABLE V

VISCOSITY INDEX AND DEWAXED OIL YIELD
FOR PRODUCTS WITH +10° TO +15° F.
POUR POINT

| EXAMPLE | SAR | VISCOSITY INDEX | DEWAXED OIL YIELD (wt. %) |
|---|---|---|---|
| 1 | 50 | 92 | 74.3 |
| 2 | 31 | 86 | 69.4 |
| 3 | 51 | 88 | 71.4 |

What is claimed is:

1. A process for hydrodewaxing a hydrocarbon oil feedstock boiling above about 350° F. which comprises contacting "a hydrocarbon oil feedstock boiling above about 350° F." and hydrogen at a hydrogen pressure of from about 300 to about 2000 psig, a temperature of from about 400° to about 900° F., and a space velocity of about 0.1 to about 10 LHSV, with a catalyst comprising about 0.5 to about 30 wt. %, based on the total weight of the catalyst, of an oxide of a Group VIII metal and an oxide of a Group VIB metal supported on a porous support, comprising a matrix containing about 50 to about 95 wt. % of a crystalline aluminosilicate zeolite selected from the group consisting of ZSM-5, ZSM-11, ZSM-12, ZSM-23, ZSM-35 and ZSM-38, based on the weight of the support, wherein the said support has a polyoxometalate-modified surface and wherein the catalyst is prepared by (1) impregnating the porous support with an aqueous solution of a heteropoly acid of a Group VIB metal, (2) drying the impregnated support in air at a temperature of about 140° F. to about 350° F. (3) impregnating the dry impregnated support prepared in step (2) in a second impregnation with an aqueous solution of a Group VIII metal salt and (4) calcining the impregnated support at a temperature of 500° to about 1150° F. thereby forming the catalyst having provided on the support a polyoxometalate-modified surface and the Group VIB metal and the Group VIII metal in oxide form.

2. The process of claim 1 wherein the said hydrocarbon oil feedstock is a waxy stock boiling in the range of about 350° to about 1100° F.

3. The process of claim 1 wherein the said hydrocarbon oil feedstock is light neutral waxy distillate stock boiling in the range of about 600° to about 1000° F.

4. The process of claim 2 wherein the said hydrocarbon oil feedstock is a waxy solvent-refined stock.

5. The process of claim 1 wherein the said catalyst contains a nickel oxide.

6. The process of claim 1 wherein the said catalyst contains an oxide of tungsten.

7. The process of claim 1 wherein the said catalyst contains an oxide of nickel and an oxide of tungsten.

8. The process of claim 1 wherein the said catalyst contains about 2 wt. % of an oxide of nickel and about 6.3 wt. % of an oxide of tungsten.

9. The process of claim 1 wherein in the catalyst the said crystalline aluminosilicate zeolite is ZSM-5 zeolite.

10. The process of claim 1 wherein in the catalyst the said matrix is alumina.

11. The process of claim 1 wherein in the catalyst the matrix is alumina, the crystalline aluminosilicate zeolite is ZSM-5 and the catalyst contains an oxide of nickel and an oxide of tungsten.

12. The process of claim 1 wherein the said support was calcined in air at a temperature of 1000° F. to about 1150° F. for 0.5 to about 8 hours prior to impregnation with the heteropoly acid of a Group VI metal and the Group VIII metal salt.

13. The process of claim 1 wherein the said heteropoly acid is 12-tungstosilicic acid.

14. The process of claim 1 wherein the said Group VIII metal salt is nickel nitrate hexahydrate.

15. The process of claim 1 wherein the said heteropoly acid is 12-tungstosilicic acid and the said Group VIII metal salt is nickel nitrate hexahydrate.

* * * * *